J. GARTSIDE.
THERMOSTATIC VALVE.
APPLICATION FILED JULY 6, 1920.

1,386,466.

Patented Aug. 2, 1921.

Inventor
John Gartside
Attorney
Fred C. Matheny

UNITED STATES PATENT OFFICE.

JOHN GARTSIDE, OF SEATTLE, WASHINGTON.

THERMOSTATIC VALVE.

1,386,466.  Specification of Letters Patent.  Patented Aug. 2, 1921.

Application filed July 6, 1920. Serial No. 394,102.

*To all whom it may concern:*

Be it known that I, JOHN GARTSIDE, a citizen of the United States, residing at Seattle, in the county of King and State of Washington, have invented certain new and useful Improvements in Thermostatic Valves, of which the following is a specification.

My invention relates to improvements in thermostatically controlled valves and the object of my improvement is to provide a valve that is adapted to close automatically in response to an unusual rise in the temperature surrounding such valve.

A more specific object is to provide a valve of this nature embodying a thermostatic or fusible member that is adapted to fuse or melt when subjected to a temperature above a predetermined minimum to thereby permit the closing of a valve.

A further object is to provide a valve of this nature that is simple in construction, reliable in operation, not expensive to manufacture and one in which all of the operating and fusible parts are completely and entirely housed thus eliminating the necessity of packing glands and making it impossible to tamper with the valve.

The valve is particularly well adapted for use in connection with conduit pipes through which gas or other inflammable substance is permitted to flow and where such valve will be operated in case of fire to close the conduit and prevent the liberation of the inflammable substance.

The invention consists in the novel construction, adaptation and combination of parts of a thermostatic valve as will be more clearly hereinafter described and claimed.

Figure 3:
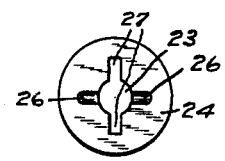
Figure 1:
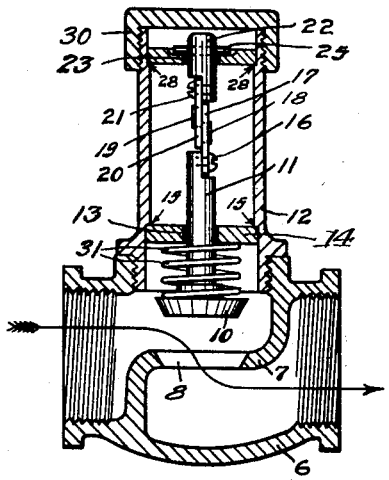
Figure 2:
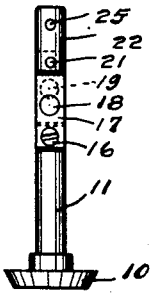
Figure 4:
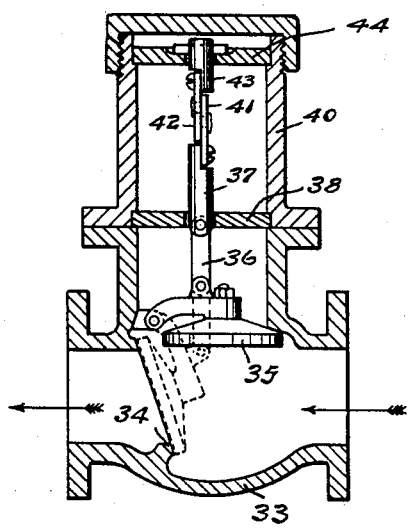

In the accompanying drawings Figure 1 is a view in cross section of a valve constructed in accordance with my invention certain parts being shown in elevation. Fig. 2 is a detached view in elevation of the valve member and valve stem including the fusible links. Fig. 3 is a detached plan view of a valve stem supporting disk embodied in the device and Fig. 4 is a sectional view showing the invention applied to a different type of valve.

Like reference numerals designate like parts throughout the several views.

Referring to the drawings the numeral 6 designates a valve casing of the type common to globe valves which casing is divided into two compartments by a partition wall 7 that is provided with a passageway 8 that forms a seat for the reception of a valve member 10.

The valve member 10 is secured to a valve stem 11 that projects upwardly into a tubular housing 12 that is rigidly secured to the valve casing 6. The valve stem is guided for longitudinal movement by passing such stem through a perforation 13 in a disk 14 that fits within the enlarged end portion of the housing 12 and rests against a shoulder 15.

The upper end of the valve stem 11 is secured by a screw 16 to a link 17 which link 17 is in turn secured as by soldering with easily fusible metal indicated at 18 and 19 to another link 20 that is secured by a screw 21 to a link stem 22.

The link stem 22 passes upwardly through a centrally arranged perforation 23 in a disk 24 and is provided near its upper end with a cross pin 25 that is adapted to rest within grooves 26 that are formed in the upper surface of the disk 24. The disk 24 is also provided with slots 27 that intersect the perforation 23 and permit the cross pin 25 to be passed upwardly therethrough in assembling the device.

The disk 24 fits within the housing 12 and rests on a shoulder 28 that is formed by boring out the upper end of such housing for a short distance.

A cap 30 is screwed over the top end of the housing thereby closing the same tightly and preventing access to the thermostatic valve mechanism.

The valve member 10 is urged toward the seat 8 by a compression spring 31 that is interposed between such valve member and the disk 14.

In securing the links 17 and 20 together such links are each preferably perforated and are then placed in overlapping relation in such a manner that the perforations are offset with respect to each other. The said perforations are then filled with molten metal as indicated at 18 and 19 that will harden and solder the two links securely together and will remain hard under ordinary working temperatures but that will fuse or melt and permit the links to drop apart as soon as the temperature surrounding the same rises above a predetermined minimum.

Obviously the links 17 and 20 may be soldered together in many different ways aside from the manner just above described.

The operative mechanism of the valve is disposed entirely within the housing 12 thereby eliminating the necessity of packing glands and making it practically impossible for persons to tamper with the valve and thermostat devices.

The thermostatic links 17 and 20 are disposed within a closed chamber having the disks 12 and 24 for end walls which chamber will be easily heated when the exterior of the housing is subjected to heat.

In assembling the valve the stem with the disk 14 and spring 31 thereon and the links 17 and 20 and link stem 22 secured thereto is inserted in the lower end of the housing 12, the disk 24 is then inserted in the upper end of such housing and slipped over the link stem 22, the cross pin 25 passing through the slots 27 and being turned so that it rests within the grooves 26. The cap 30 is then screwed on to the housing and the housing screwed into the valve casing 6.

The links 17 and 20 normally serve to hold the valve member in an open position and maintain the spring 31 under compression thereby permitting an unobstructed flow of gas or liquid through the valve in the direction indicated by the arrow. When the valve is subjected to unusual heat the thermostatic solder that holds the links 17 and 20 together will be melted thus permitting the links to part and allowing the spring 31 to close the valve and shut off the flow of gas or liquid through the valve.

When this valve is interposed in the line of a gas inlet pipe leading to a meter in a building and a fire occurs the valve will be operated by the heat from the fire and will shut off the flow of gas before such fire becomes hot enough to melt the usual lead pipes that connect with the meter or to melt the meter and thereby liberate the gas.

In Fig. 4, I have shown the invention applied to a flap valve comprising a valve casing 33 having a valve seat 34 arranged to be closed by a valve member 35 that is normally supported in an open position by a link 36 that is pivotally connected with a stem 37 that passes upwardly through a guide disk 38 in a tubular housing 40 and is connected at its upper end with thermostatic links 41 and 42 which in turn are connected with another stem 43 that is supported by a disk 44. The links 41 and 42 are soldered together with thermostatic metal in the same manner as the links 17 and 20 which metal will melt when subjected to unusual heat and permit the valve to be closed by the combined action of gravity and of the pressure of the gas or liquid that is flowing through the valve in the direction indicated by the arrow.

The operation of the valve shown in Fig. 4 is substantially the same as the operation of the valve shown in Figs. 1, 2 and 3.

From the above description taken in connection with the accompanying drawings the form of construction and method of operation of my thermostatic valve will be readily understood, but, while I have described the principle of operation of the invention together with the device which I now consider to be the best embodiment thereof it will be understood that the device shown is merely illustrative and that such changes in the construction thereof may be resorted to as are within the spirit of the invention.

What I claim is:

1. A thermostatic valve including a valve casing having a valve seat, a housing communicating with said valve casing, a removable cap for said housing, a valve for said valve seat, a two-part valve stem on said valve and arranged to project into said valve stem housing, the two parts of said valve stem being secured together by readily fusible metal, a spring for urging said valve toward said seat, a partition wall in said housing adjacent said removable cap, said partition wall having a central perforation and having diametrically arranged slots that intersect said perforation and diametrically arranged grooves that are offset with respect to said slots and that intersect said perforation, and a cross pin in the upper end of said valve stem arranged to pass through said slots and rest in said grooves.

2. A thermostatic valve including a valve casing having a passageway therethrough, a valve member arranged to close said passageway a tubular housing arranged to screw into said valve casing said tubular housing being of larger diameter near its two ends to afford upper and lower shoulders, a disk arranged to rest against said lower shoulder said disk having a centrally arranged perforation, a valve stem secured to said valve member and arranged to project through the perforation of said disk, a compression spring interposed between said valve member and said disk, a link secured to the upper end of said valve stem, another link soldered by easily fusible metal to said first named link, a link stem secured to said last named link, a disk arranged to rest upon the shoulder in the upper end of said housing said disk having a centrally arranged perforation and having diametrically arranged slots that intersect said perforation and diametrically arranged grooves that are offset with respect to said slots and that intersect said perforation and a cross pin, in the upper end of said link stem arranged to pass through said slots and rest in said grooves.

Signed at Seattle, Washington, this 25th day of June, 1920.

JOHN GARTSIDE.